US008770545B2

(12) United States Patent
Whipps et al.

(10) Patent No.: US 8,770,545 B2
(45) Date of Patent: Jul. 8, 2014

(54) SLIDE GATE WITH FALL-PROTECTION FEATURE

(75) Inventors: George E. Whipps, Athol, MA (US); Michael R. Toomey, Athol, MA (US)

(73) Assignee: Whipps, Inc., Athol, MA (US)

(*) Notice: Subject to any disclaimer, the term of this patent is extended or adjusted under 35 U.S.C. 154(b) by 483 days.

(21) Appl. No.: 13/092,327

(22) Filed: Apr. 22, 2011

(65) Prior Publication Data

US 2011/0259429 A1 Oct. 27, 2011

Related U.S. Application Data

(60) Provisional application No. 61/326,732, filed on Apr. 22, 2010.

(51) Int. Cl.
*F16K 31/44* (2006.01)

(52) U.S. Cl.
USPC .......... 251/264; 251/284; 251/326; 74/89.37; 74/89.45; 74/841

(58) Field of Classification Search
USPC ................. 251/264, 266, 284, 326, 327, 273; 405/105, 106; 74/89.37, 89.45, 841
See application file for complete search history.

(56) References Cited

U.S. PATENT DOCUMENTS 4,028,896 A 6/1977 Whipps
4,226,553 A 10/1980 Whipps et al.
4,439,061 A 3/1984 Whipps
4,848,962 A 7/1989 Whipps
4,964,613 A * 10/1990 Logman ........................ 251/267
6,176,493 B1 1/2001 Whipps

* cited by examiner

*Primary Examiner* — John K Fristoe, Jr.
*Assistant Examiner* — Marina Tietjen
(74) *Attorney, Agent, or Firm* — Pandiscio & Pandiscio

(57) ABSTRACT

A slide gate comprising:

a frame assembly which defines an opening through which fluid flows;

a slide plate movably mounted to the frame assembly for vertical movement relative thereto so as to selectively open and close the opening in the frame assembly;

an operating mechanism for vertically moving the slide plate between its open and closed positions so as to regulate fluid flow through the opening in the frame assembly, wherein the operating mechanism comprises a threaded operating stem which is secured to the top of the slide plate and which extends through a threaded operating nut which is rotatably mounted to the frame assembly, and means for rotating the threaded operating nut so as to cause longitudinal movement of the threaded operating stem relative to the threaded operating nut, so as to raise or lower the slide plate, whereby to open or close the opening in the slide gate; and a threaded fall-protection nut disposed on the threaded operating stem in spaced relation to the threaded operating nut and configured to rotate in unison with the threaded operating nut, the threaded operating nut being spaced from a fall-protection stop plate which is connected to the frame assembly.

18 Claims, 5 Drawing Sheets

SLIDE GATE WITH FALL-PROTECTION FEATURE

REFERENCE TO PENDING PRIOR PATENT APPLICATION

This patent application claims benefit of pending prior U.S. Provisional Patent Application Ser. No. 61/326,732, filed Apr. 22, 2010 by George E. Whipps et al. for SLIDE GATE WITH FALL-SAFE™ FEATURE, which patent application is hereby incorporated herein by reference.

FIELD OF THE INVENTION

This invention relates to fluid control gates in general, and more particularly to slide gates.

BACKGROUND OF THE INVENTION

Slide gates are used to control fluid flow through a passageway or channel. More particularly, and looking now at FIGS. 1 and 2, there is shown an exemplary slide gate 5. Slide gate 5 generally comprises a frame assembly 10 which defines an opening 15 through which fluid flows; a slide plate 20 movably mounted to frame assembly 10 for vertical movement relative thereto so as to selectively open and close opening 15 in frame assembly 10; sealing members 25 for providing a substantially watertight seal between slide plate 20 and frame assembly 10; and an operating mechanism 30 for vertically moving slide plate 20 between its open and closed positions so as to regulate fluid flow through opening 15 in frame assembly 10. As is well known in the art, frame assembly 10 of slide gate 5 is disposed across a fluid passageway or channel 32 so that slide gate 5 can control fluid flow through the fluid passageway or channel 32.

As seen in FIGS. 1 and 2, operating mechanism 30 for vertically moving slide plate 20 within frame assembly 10 generally comprises an elongated screw 35 (sometimes hereinafter referred to as a threaded operating stem) which is secured to the top of slide plate 20 and which extends through a threaded operating nut 40 which is rotatably mounted to the top of frame assembly 10. Rotation of threaded operating nut 40 (e.g., by hand wheel, crank, electric motor, etc.) causes longitudinal movement of threaded operating stem 35 relative to threaded operating nut 40 (and hence relative to frame assembly 10), so as to raise or lower slide plate 20, whereby to open or close the slide gate.

Unfortunately, it has been found that, where the gate operating loads are high (e.g., due to heavy gate weights, substantial frictional forces generated during gate movement, particularly due to water pressure on the gate, etc.), the threads on threaded operating stem 35 and threaded operating nut 40 wear over time. This is particularly true with respect to the threads on threaded operating nut 40, since they are substantially continuously in use (whereas only a portion of the threads on threaded operating stem 35 are in use at any given time). In some cases, such wear can cause the threads on threaded operating nut 40 to fail completely, so that slide plate 20 falls within frame assembly 10 and—unintentionally—closes the slide gate. In this situation, because the threads on threaded operating nut 40 have failed, it is then also impossible to re-open the slide gate using the aforementioned operating mechanism 30. Flooding can result upstream of the slide gate.

The present invention is intended to provide a slide gate with a fall-protection feature, so that thread failure on the threaded operating nut does not result in unintentional gate closure.

SUMMARY OF THE INVENTION

The present invention comprises the provision and use of a novel slide gate with a fall-protection feature, so that thread failure on the threaded operating nut does not result in unintentional gate closure.

In one form of the present invention, there is provided a slide gate comprising:

- a frame assembly which defines an opening through which fluid flows;
- a slide plate movably mounted to the frame assembly for vertical movement relative thereto so as to selectively open and close the opening in the frame assembly;
- an operating mechanism for vertically moving the slide plate between its open and closed positions so as to regulate fluid flow through the opening in the frame assembly, wherein the operating mechanism comprises a threaded operating stem which is secured to the top of the slide plate and which extends through a threaded operating nut which is rotatably mounted to the frame assembly, and means for rotating the threaded operating nut so as to cause longitudinal movement of the threaded operating stem relative to the threaded operating nut, so as to raise or lower the slide plate, whereby to open or close the opening in the slide gate; and
- a threaded fall-protection nut disposed on the threaded operating stem in spaced relation to the threaded operating nut and configured to rotate in unison with the threaded operating nut, the threaded operating nut being spaced from a fall-protection stop plate which is connected to the frame assembly.

In another form of the present invention, there is provided a method for controlling fluid flow through a passageway, the method comprising:

- providing a slide gate across the passageway, the slide gate comprising:
  - a frame assembly which defines an opening through which fluid flows;
  - a slide plate movably mounted to the frame assembly for vertical movement relative thereto so as to selectively open and close the opening in the frame assembly;
  - an operating mechanism for vertically moving the slide plate between its open and closed positions so as to regulate fluid flow through the opening in the frame assembly, wherein the operating mechanism comprises a threaded operating stem which is secured to the top of the slide plate and which extends through a threaded operating nut which is rotatably mounted to the frame assembly, and means for rotating the threaded operating nut so as to cause longitudinal movement of the threaded operating stem relative to the threaded operating nut, so as to raise or lower the slide plate, whereby to open or close the opening in the slide gate; and
  - a threaded fall-protection nut disposed on the threaded operating stem in spaced relation to the threaded operating nut and configured to rotate in unison with the threaded operating nut, the threaded operating nut being spaced from a fall-protection stop plate which is connected to the frame assembly; and using the operating mechanism to adjust the disposition of the slide plate within the frame.

BRIEF DESCRIPTION OF THE DRAWINGS

These and other objects and features of the present invention will be more fully disclosed or rendered obvious by the following detailed description of the preferred embodiments of the invention, which is to be considered together with the accompanying drawings wherein like numbers refer to like parts, and further wherein.

DETAILED DESCRIPTION OF THE PREFERRED EMBODIMENTS

The present invention comprises the provision and use of a novel slide gate with a fall-protection feature, so that thread failure on the threaded operating nut does not result in unintentional gate closure.

Figure 1:
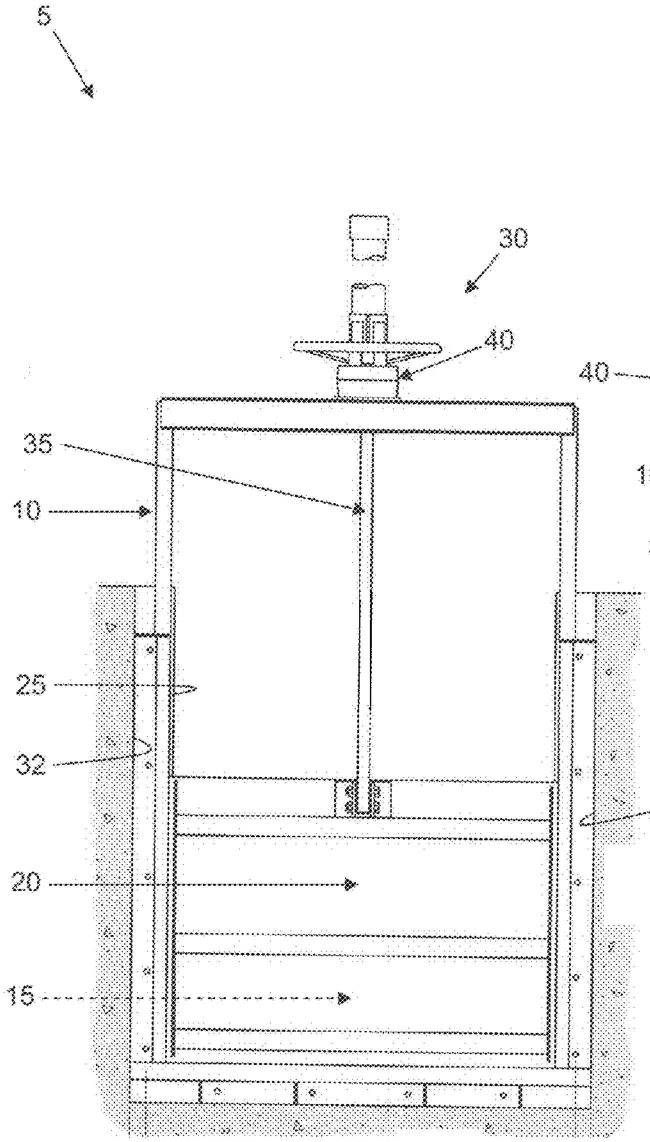
FIG. 1 PRIOR ART
FIG. 1 is a schematic front view of a prior art slide gate.
Figure 2:
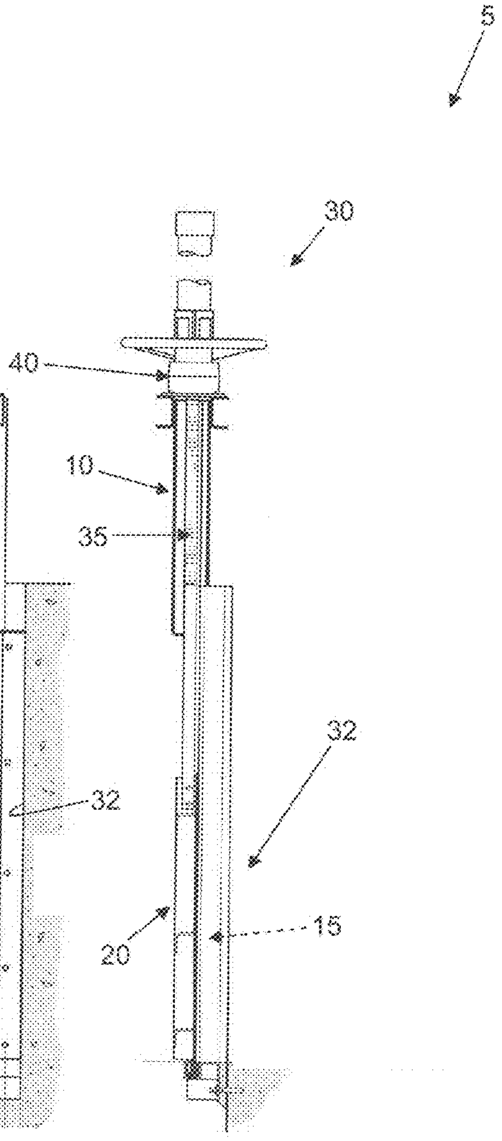
FIG. 2 PRIOR ART
FIG. 2 is a schematic side view of the prior art slide gate of FIG. 1.
Figure 3:
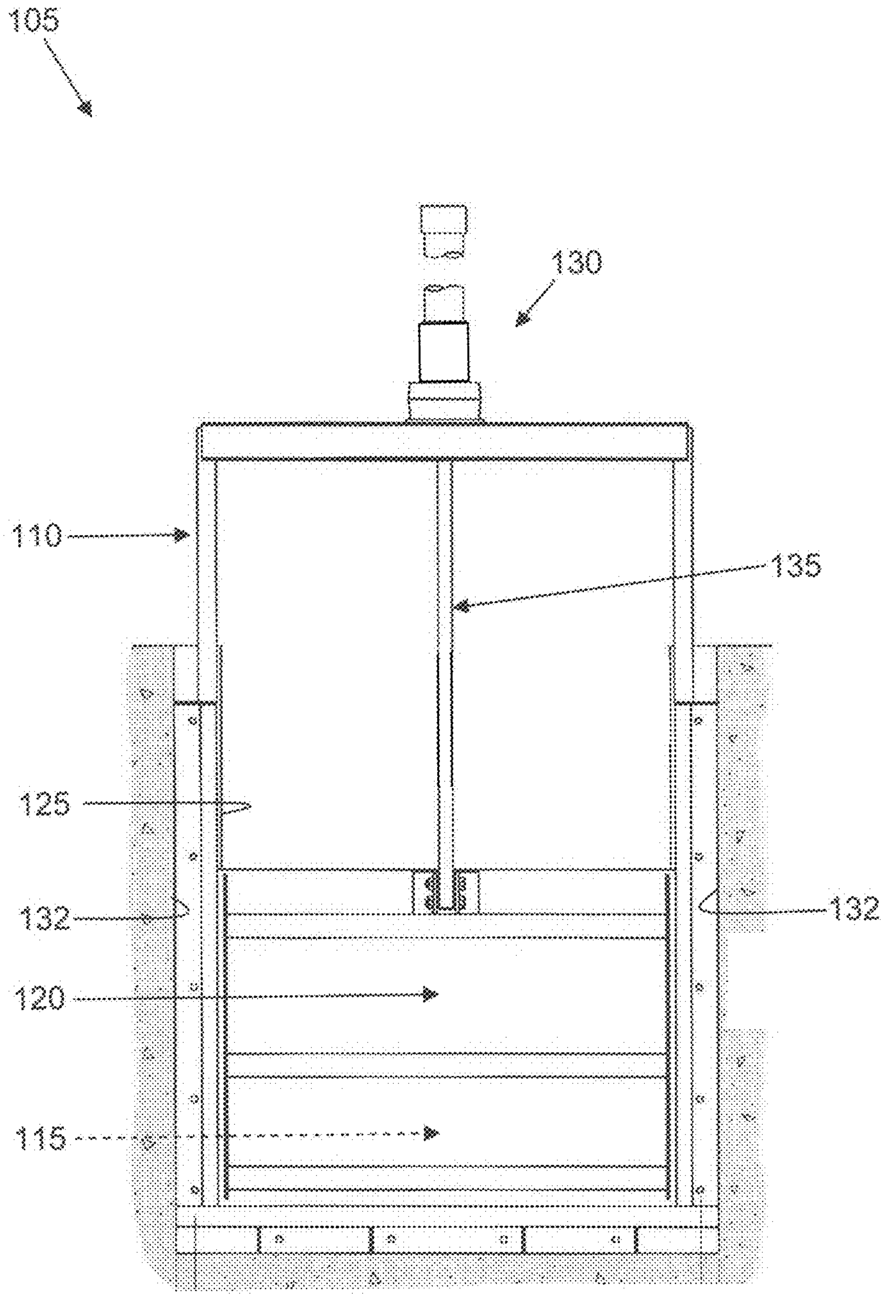
FIG. 3 is a schematic front view of a novel slide gate formed in accordance with the present invention.
Figure 4:
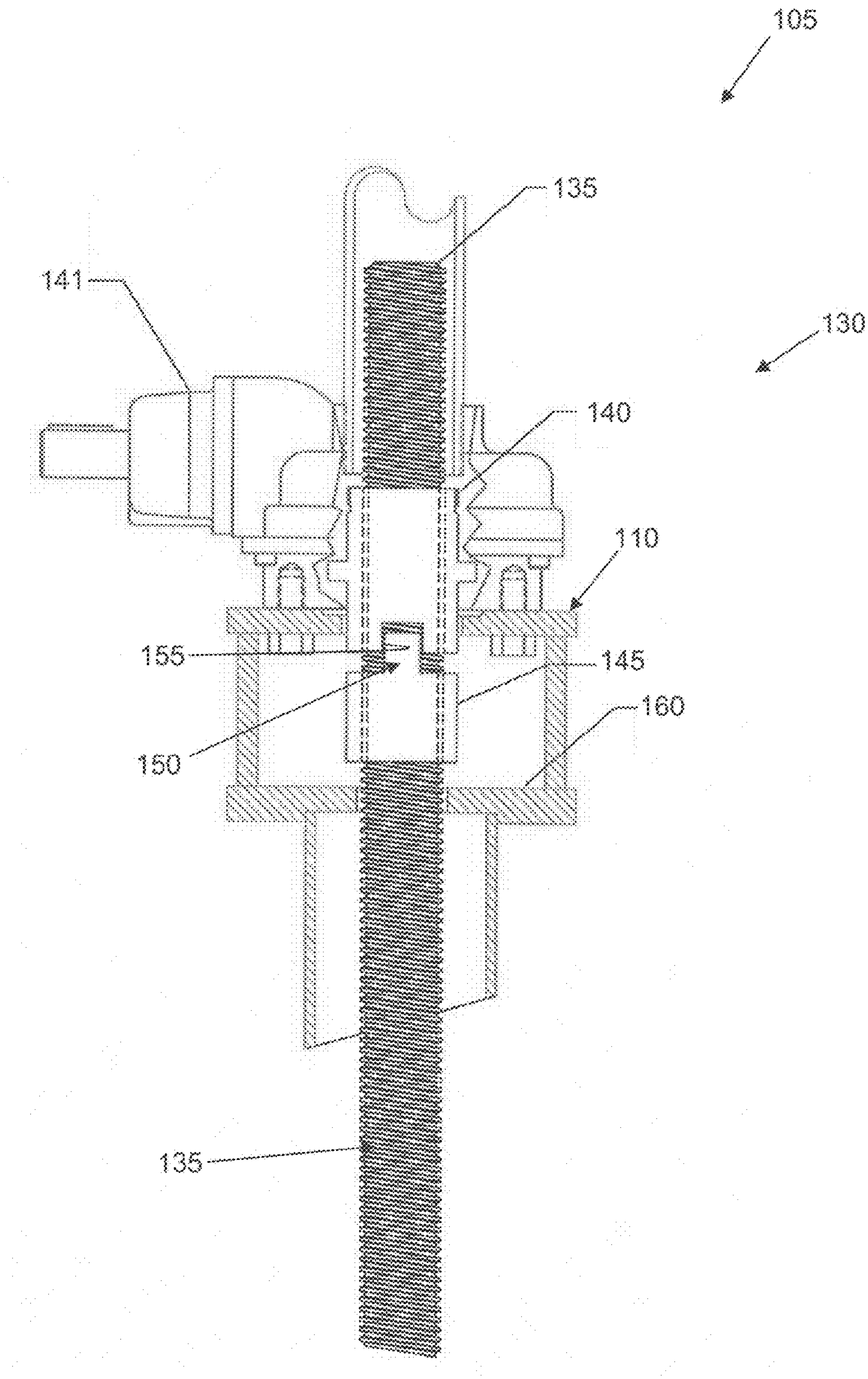
FIG. 4 is an enlarged side view of selected portions of the novel slide gate of FIG. 3.

More particularly, and looking now at FIGS. 3 and 4, there is shown a novel slide gate 105 formed in accordance with the present invention. Slide gate 105 generally comprises a frame assembly 110 which defines an opening 115 through which fluid flows; a slide plate 120 movably mounted to frame assembly 110 for vertical movement relative thereto so as to selectively open and close opening 115 in frame assembly 110; sealing members 125 for providing a substantially watertight seal between slide plate 120 and frame assembly 110; and an operating mechanism 130 for vertically moving slide plate 120 between its open and closed positions so as to regulate fluid flow through opening 115 in frame assembly 110. As will be appreciated by those skilled in the art, frame assembly 110 is intended to be disposed across a fluid passageway or channel 132 so that slide gate 105 can control fluid flow through the fluid passageway or channel 132.

As seen in FIGS. 3 and 4, operating mechanism 130 for vertically moving slide plate 120 within frame assembly 110 generally comprises an elongated screw 135 (sometimes hereinafter referred to as a threaded operating stem) which is secured to the top of slide plate 120 and which extends through a threaded operating nut 140 which is rotatably mounted to the top of frame assembly 110. Rotation of threaded operating nut 140 (e.g., by an electric motor 141) causes longitudinal movement of threaded operating stem 135 relative to threaded operating nut 140 (and hence relative to frame assembly 110), so as to raise or lower slide plate 120, whereby to open or close the slide gate.

In accordance with the present invention, novel slide gate 105 also comprises a threaded fall-protection nut 145. Fall-protection nut 145 is disposed on threaded operating stem 135 in spaced relation to threaded operating nut 140. Threaded fall-protection nut 145 normally carries no load (and hence typically suffers little wear over time) and is designed to rotate in unison with threaded operating nut 140, e.g., via a tongue-and-groove connection wherein a tongue 150 on threaded fall-protection nut 145 is received in a groove 155 formed on threaded operating nut 140. Threaded fall-protection nut 145 normally sits spaced from a fall-protection stop plate 160 which is connected to frame assembly 110. In the event of thread failure (e.g., at threaded operating nut 140), as threaded operating stem 135 falls within the threaded operating nut, threaded fall-protection nut 145 moves downwardly with the falling threaded operating stem (with tongue 150 slipping out of its associated groove 155) until the bottom of threaded fall-protection nut 145 hits fall-protection stop plate 160, whereupon downward motion of threaded operating stem 135 (and hence downward motion of slide plate 120) ceases. In this respect it will be appreciated that since threaded fall-protection nut 145 normally carries no load, its threads typically suffer little wear over time and hence are intact and able to support the load of threaded operating stem 135 and slide plate 120 in the event of thread failure on threaded operating nut 140. By appropriately sizing the gap which normally exists between fall-protection nut 145 and fall-protection stop plate 160 (e.g., at ½ inch), the present invention can ensure that thread failure results in minimal slide plate movement.

Figure 5:
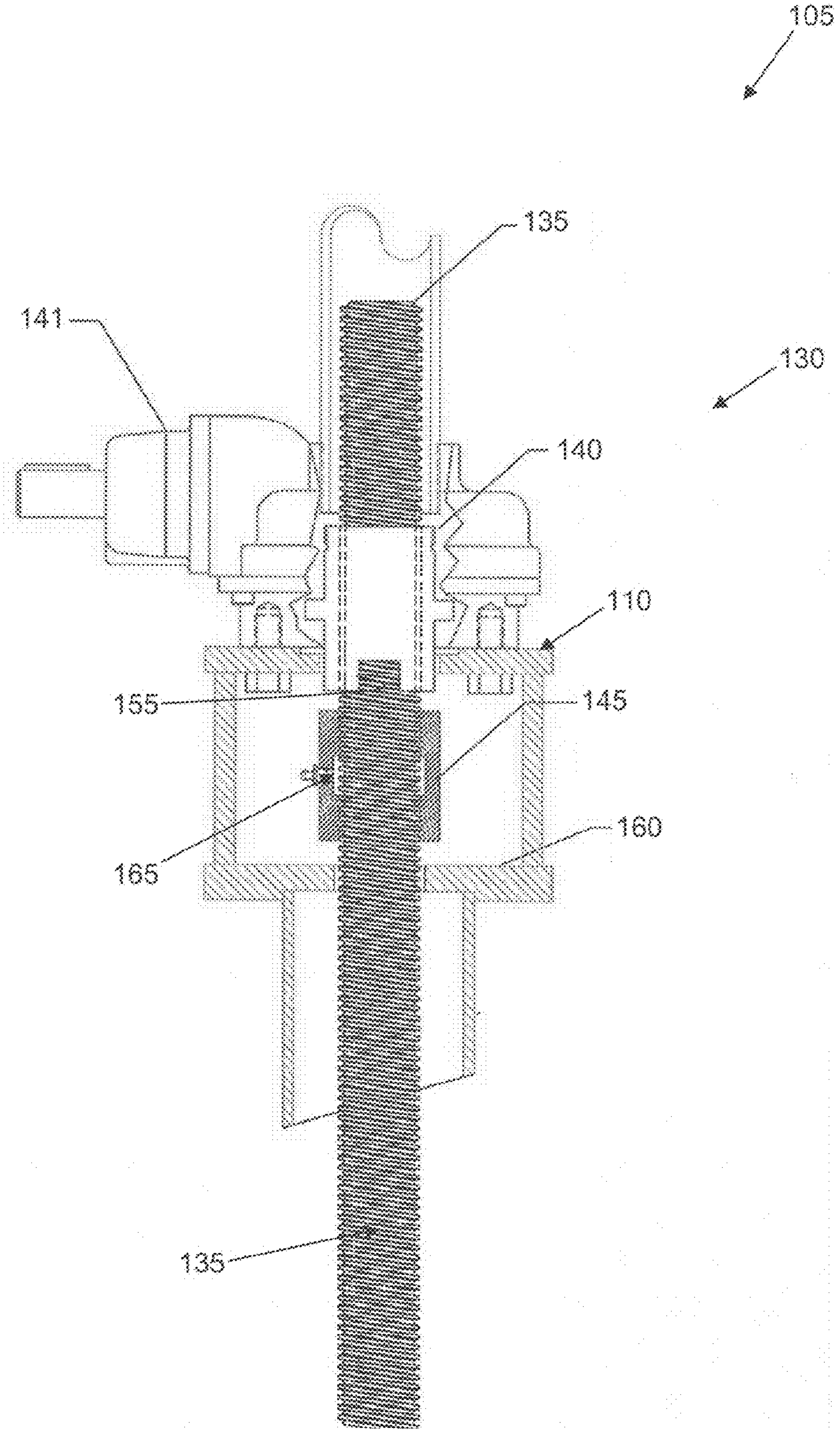
FIG. 5 is a schematic side view of selected portions of another novel slide gate formed in accordance with the present invention.

FIG. 5 shows a modified version of the construction shown in FIGS. 3 and 4. More particularly, FIG. 5 shows how threaded fall-protection nut 145 can be equipped with a grease reservoir 165 so as to minimize thread wear in the fall-protection nut 145 due to friction between the threaded fall-protection nut 145 and threaded operating stem 135. In this respect it should be appreciated that fall-protection nut 145 is shown in section in FIG. 5.

Figure 6:
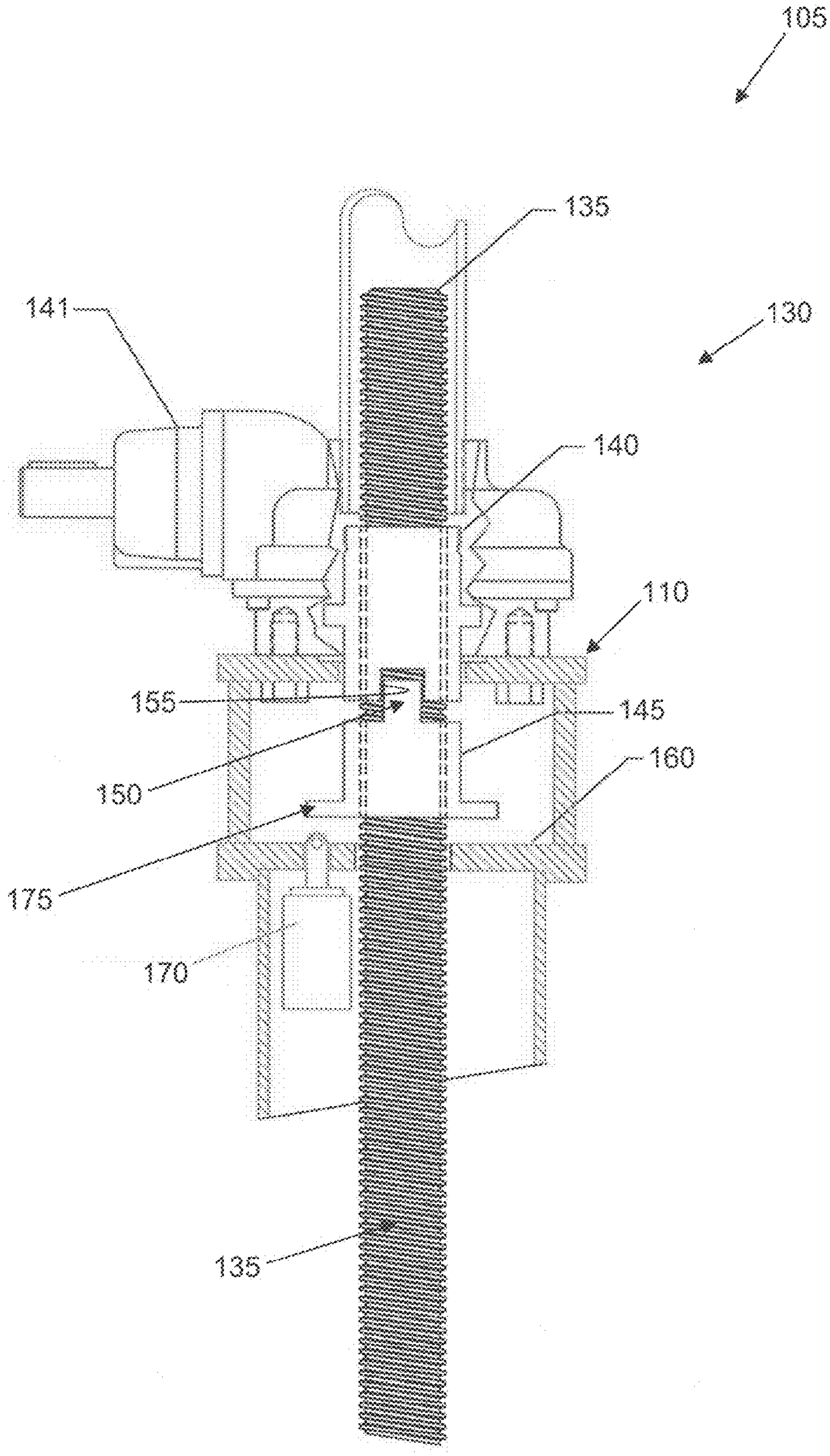
FIG. 6 is a schematic side view of selected portions of still another novel slide gate formed in accordance with the present invention.

FIG. 6 shows another modified version of the construction shown in FIGS. 3 and 4. Among other things, this construction is provided with an electrical sensing device 170 which can provide a warning (e.g., a sound alarm, a light alarm, etc.) in the event that the threads fail and threaded fall-protection nut 145 engages fall-protection stop plate 160. In one form of the invention, electrical sensing device 170 is mounted to fall-protection stop plate 160 parallel to, but laterally displaced from, threaded operating stem 135, and threaded fall-protection nut 145 is provided with a flange 175 which is longitudinally aligned with electrical sensing device 170, such that flange 175 will engage electrical sensing device 170 when fall-protection nut 145 engages fall-protection stop plate 160.

MODIFICATIONS

It should be understood that many additional changes in the details, materials, steps and arrangements of parts, which have been herein described and illustrated in order to explain the nature of the present invention, may be made by those skilled in the art while still remaining within the principles and scope of the invention.

What is claimed is:

1. A slide gate comprising:

a frame assembly which defines an opening through which fluid flows;

a slide plate movably mounted to the frame assembly for vertical movement relative thereto so as to selectively open and close the opening in the frame assembly;

an operating mechanism for vertically moving the slide plate between its open and closed positions so as to regulate fluid flow through the opening in the frame assembly, wherein the operating mechanism comprises a threaded operating stem which is secured to a top of the slide plate and which extends through a threaded operating nut which is rotatably mounted to the frame assembly, and means for rotating the threaded operating nut so as to cause longitudinal movement of the threaded operating stem relative to the threaded operating nut, so as to raise or lower the slide plate, whereby to open or close the opening in the slide gate; and a threaded fall-protection nut disposed on the threaded operating stem in spaced relation to the threaded operating nut and configured to rotate in unison with the threaded operating nut, the threaded operating nut being spaced from a fall-protection stop plate which is connected to the frame assembly.

2. A slide gate according to claim 1 wherein the threaded fall-protection nut is disposed below the threaded operating nut.

3. A slide gate according to claim 1 wherein the threaded fall-protection nut is releasably connected to the threaded operating nut by a tongue-and-groove connection.

4. A slide gate according to claim 3 wherein the threaded fall-protection nut comprises a tongue and the threaded operating nut comprises a groove.

5. A slide gate according to claim 1 wherein the threaded fall-protection nut comprises a grease reservoir.

6. A slide gate according to claim 1 further comprising a sensor for determining when the threaded fall-protection nut engages the fall-protection stop plate.

7. A slide gate according to claim 6 wherein the sensor is mounted to the fall-protection stop plate parallel to, but laterally spaced from, the threaded operating stem and the threaded fall-protection nut is provided with a flange which is longitudinally aligned with the sensor such that the flange will engage the sensor when the fall-protection nut engages the fall-protection stop plate.

8. A slide gate according to claim 1 further comprising at least one sealing member for providing a substantially watertight seal between the slide plate and the frame assembly.

9. A slide gate according to claim 1 wherein the means for rotating comprises at least one from the group consisting of a hand wheel, a crank and an electric motor.

10. A method for controlling fluid flow through a passageway, the method comprising:

providing a slide gate across the passageway, the slide gate comprising:

a frame assembly which defines an opening through which fluid flows;

a slide plate movably mounted to the frame assembly for vertical movement relative thereto so as to selectively open and close the opening in the frame assembly;

an operating mechanism for vertically moving the slide plate between its open and closed positions so as to regulate fluid flow through the opening in the frame assembly, wherein the operating mechanism comprises a threaded operating stem which is secured to a top of the slide plate and which extends through a threaded operating nut which is rotatably mounted to the frame assembly, and means for rotating the threaded operating nut so as to cause longitudinal movement of the threaded operating stem relative to the threaded operating nut, so as to raise or lower the slide plate, whereby to open or close the opening in the slide gate; and a threaded fall-protection nut disposed on the threaded operating stem in spaced relation to the threaded operating nut and configured to rotate in unison with the threaded operating nut, the threaded operating nut being spaced from a fall-protection stop plate which is connected to the frame assembly; and using the operating mechanism to adjust the disposition of the slide plate within the frame.

11. A method according to claim 10 wherein the threaded fall-protection nut is disposed below the threaded operating nut.

12. A method according to claim 10 wherein the threaded fall-protection nut is releasably connected to the threaded operating nut by a tongue-and-groove connection.

13. A method according to claim 12 wherein the threaded fall-protection nut comprises a tongue and the threaded operating nut comprises a groove.

14. A method according to claim 10 wherein the threaded fall-protection nut comprises a grease reservoir.

15. A method according to claim 10 further comprising a sensor for determining when the threaded fall-protection nut engages the fall-protection stop plate.

16. A method according to claim 15 wherein the sensor is mounted to the fall-protection stop plate parallel to, but laterally spaced from, the threaded operating stem and the threaded fall-protection nut is provided with a flange which is longitudinally aligned with the sensor such that the flange will engage the sensor when the fall-protection nut engages the fall-protection stop plate.

17. A method according to claim 10 further comprising at least one sealing member for providing a substantially watertight seal between the slide plate and the frame assembly.

18. A method according to claim 10 wherein the means for rotating comprises at least one from the group consisting of a hand wheel, a crank and an electric motor.

* * * * *